United States Patent
Schröder et al.

(10) Patent No.: US 12,151,444 B2
(45) Date of Patent: Nov. 26, 2024

(54) METHOD FOR PRODUCING COMPOSITE COMPONENTS HAVING AN UNDEVELOPABLE SURFACE

(71) Applicant: Airbus Operations GmbH, Hamburg (DE)

(72) Inventors: René Schröder, Hamburg (DE); Konstantin Schubert, Hamburg (DE); Sebastian Kerger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/719,644

(22) Filed: Apr. 13, 2022

(65) Prior Publication Data
US 2022/0332063 A1    Oct. 20, 2022

(30) Foreign Application Priority Data
Apr. 16, 2021    (DE) .................... 10 2021 109 699.5

(51) Int. Cl.
*B29C 70/54* (2006.01)
*B29C 37/00* (2006.01)
(Continued)

(52) U.S. Cl.
CPC ............ *B29C 70/545* (2013.01); *B29C 70/18* (2013.01); *B29C 70/345* (2013.01);
(Continued)

(58) Field of Classification Search
CPC ............... B29C 2037/90; B29C 37/02; B29C 2793/0072; B29C 2793/0081;
(Continued)

(56) References Cited

U.S. PATENT DOCUMENTS

| 4,534,813 A | 8/1985 | Williamson et al. |
| 5,038,291 A | 8/1991 | Wang et al. |

(Continued)

FOREIGN PATENT DOCUMENTS

| DE | 10 2007 032 904 B3 | 11/2008 |
| DE | 102010043665 A1 | 5/2012 |

(Continued)

OTHER PUBLICATIONS

German Search Report for Application No. 102021109699 dated Nov. 30, 2021.

(Continued)

*Primary Examiner* — Jeffrey M Wollschlager
*Assistant Examiner* — Edgaredmanuel Troche
(74) *Attorney, Agent, or Firm* — KDW Firm PLLC (57) ABSTRACT

Method for producing composite components having an undevelopable surface. To be able to maintain the tolerances when manufacturing especially large components in the case of composite components with undevelopable surfaces, it is proposed according to the invention to drape a cut-to-size blank on a molding tool and to determine the deviation of the cut-to-size blank edge from the setpoint cut-to-size edge. Then, on the basis of the deviation, a new cut-to-size blank edge is calculated, and a new cut-to-size blank is created and re-draped for examination purposes. The method is repeated until the deviations are below a tolerable threshold value. The method is furthermore carried out for each textile ply of the composite component.

9 Claims, 4 Drawing Sheets

(51) Int. Cl.
  *B29C 70/18* (2006.01)
  *B29C 70/34* (2006.01)
  *B29K 105/08* (2006.01)
  *B29L 31/30* (2006.01)

(52) U.S. Cl.
  CPC .... *B29C 2037/90* (2013.01); *B29K 2105/089* (2013.01); *B29L 2031/3076* (2013.01)

(58) Field of Classification Search
  CPC ....... B29C 70/18; B29C 70/30; B29C 70/345; B29C 70/545; B29K 2105/0872; B29K 2105/089; G06F 2113/24; G06F 2113/26; G06F 30/20; B26D 2005/002; B26D 5/00; B26D 5/005; B26D 5/007
  USPC .......................................................... 264/138
  See application file for complete search history.

(56) References Cited

U.S. PATENT DOCUMENTS

| | | | |
|---|---|---|---|
| 8,647,545 B2 | 2/2014 | Stiesdal | |
| 9,180,625 B2* | 11/2015 | Bernadet et al. | B29C 70/222 |
| 9,399,325 B2 | 7/2016 | Barlag et al. | |
| 9,403,334 B1* | 8/2016 | Rotter | B29D 99/0014 |
| 9,694,546 B2 | 7/2017 | Kisch | |
| 10,062,202 B2 | 8/2018 | Chen-Keat et al. | |
| 2010/0112190 A1* | 5/2010 | Drewett | B29C 73/10 427/9 |
| 2015/0231835 A1 | 8/2015 | Pridie | |
| 2016/0102966 A1* | 4/2016 | Grossnickle | G01B 11/06 356/630 |
| 2016/0217220 A1 | 7/2016 | Carrera et al. | |
| 2018/0207891 A1* | 7/2018 | Henry | B29C 70/546 |
| 2018/0236733 A1* | 8/2018 | Hollander | B29C 70/543 |
| 2019/0001589 A1* | 1/2019 | Salimi | F03D 1/0675 |

FOREIGN PATENT DOCUMENTS

| | | |
|---|---|---|
| EP | 0 470 901 A1 | 2/1992 |
| EP | 2197638 B1 | 11/2011 |
| EP | 2897784 A2 | 7/2015 |
| EP | 2804730 B1 | 6/2018 |
| EP | 3351370 A1 | 7/2018 |
| WO | WO 2013/138015 A1 | 9/2013 |

OTHER PUBLICATIONS

European Search Report for U.S. Appl. No. 22/167,368 dated Sep. 2, 2022.

* cited by examiner

METHOD FOR PRODUCING COMPOSITE COMPONENTS HAVING AN UNDEVELOPABLE SURFACE

CROSS-REFERENCE TO RELATED APPLICATION

This application claims priority to German Patent Application DE 10 2021 109 699.5 filed Apr. 16, 2021, the entire disclosure of which is incorporated by reference herein.

TECHNICAL FIELD

The disclosure herein relates to various methods carried out in the production of composite components having undevelopable surfaces.

BACKGROUND

For the prior art, reference is made to US 2015/0231835 A1, U.S. Pat. Nos. 4,534,813 A, 9,694,546 B2, 10,062,202 B2, 8,647,545 B2, 9,180,625 B2, WO 2013/138015 A1, EP 2804730 B1 and U.S. Pat. No. 9,399,325 B2.

Undevelopable surfaces, also referred to as doubly curved surfaces, cannot be transformed from their 3D shape to a 2D surface without distortion. Composite components with such shaping are therefore generally produced by advanced fiber placement methods or, within certain limits, also by draping methods. The tolerances in terms of fiber volume content and/or geometry are critical for whether an undevelopable surface can be produced by the latter method. In this respect, in general no problems caused by the undevelopable surface arise in the case of components which do not have ramps within them but only at edges or only in regions that are removed in any case when the final contour is being manufactured.

However, in the case of the components discussed in the present document, the tolerance in terms of fiber volume content or geometry is set so narrow that the conventional methods no longer suffice. This occurs in particular due to high fiber volume contents or else in the case of ramps or thickness changes in the component.

SUMMARY

The disclosure herein is based on an object of improving the production of composite components with undevelopable surfaces.

The object is achieved by the subject matter disclosed herein.

The disclosure herein provides a method for ascertaining cutting-to-size data, on the basis of which it is possible to cut a textile sheet material to size in order to obtain a cut-to-size textile ply suitable for the production of a composite component that is formed from textile plies and has an undevelopable surface, wherein the cutting-to-size method comprises:
 a) providing a textile sheet material in the form of a cut-to-size blank, which has at least one cut-to-size blank edge;
 b) draping the cut-to-size blank on a molding tool or preceding cut-to-size blank suitable for the production of the composite component;
 c) ascertaining a deviation of the profile, resulting from step b), of the cut-to-size blank edge and a profile, predefined by the undevelopable surface, from setpoint cut-to-size edges;
 d) when the extent of the deviation ascertained in step c) is above a predefined threshold value: changing the profile of the cut-to-size blank edge on the basis of the deviation ascertained in step c) and repeating steps b) to d),
 otherwise storing the profile of the cut-to-size blank edge for this cut-to-size blank in the form of cutting-to-size data, and arranging the cut-to-size blank on the molding tool or the preceding cut-to-size blank.

It is preferred that in step a) the cut-to-size blank is cut to size from the textile sheet material as in the case of a developable surface.

It is preferred that in step a) the cut-to-size blank is formed by a textile sheet material that has an oversize in relation to a molding tool suitable for the production of the composite component.

It is preferred that in step c) the deviation is ascertained using a measuring grid and/or a setpoint cut-to-size edge projected onto the cut-to-size blank.

It is preferred that in step c) the deviation is ascertained using an image recording or a 3D scan of the cut-to-size blank and a corresponding evaluation.

It is preferred that in step d) the profile of the cut-to-size blank edge is changed by cutting to size a further cut-to-size blank on the basis of the changed profile of the cut-to-size blank edge.

It is preferred that steps a) to d) are carried out for each textile ply of the composite component.

It is preferred that steps a) to d) are carried out for each textile ply of the composite component that covers only part of the composite component, begins or ends within the composite component, and/or does not begin or end close to the component periphery that is intended to be cut.

The disclosure herein provides a method for cutting a textile sheet material to size in order to obtain a cut-to-size textile ply suitable for the production of a composite component that is formed from textile plies and has an undevelopable surface, wherein the method comprises:
 a) carrying out a method described above in order to obtain cutting-to-size data; and
 b) cutting the textile sheet material to size on the basis of the cutting-to-size data, in order to obtain the cut-to-size textile ply.

The disclosure herein provides a method for producing a composite component that is formed from textile plies and has an undevelopable surface, wherein the method comprises:
 a) carrying out a method described above;
 b) draping cut-to-size textile plies on the molding tool, in order to obtain a component precursor formed from textile plies;
 c) carrying out a transfer molding method with a closed mold or a vacuum method with a vacuum bag, in order to form the composite component from the component precursor.

The disclosure herein is required for the production of large, complex parts that have undevelopable (doubly curved) shells and internal ramps and which are intended for production either in a closed mold method (e.g., RTM) or in a method exhibiting local pressure pieces on the ramps that are intended to follow the contour of the part. Furthermore, the parts in question should be produced from two-dimensional textiles (e.g., woven or laid fabrics). The need for the outlined improvement is especially high if the ramps involved are relatively steep (1:20 or steeper), or if the tolerance requirements relevant to the part are narrow in terms of acceptable deviations in the local proportion by volume of fibers. All of these points are prevalent in the case of large composite-material parts in aeronautics and aerospace that are designed for minimum weight.

Large composite-material parts in aeronautics and aerospace are generally produced from prepregs. An alternative method is the production of the parts by dry textiles and an injection or infusion technology. Various methods exist, of which methods using closed molds (e.g. RTM or SQ-RTM) offer the best results in terms of repeatability of the thicknesses and surface qualities produced.

The conventional approach for the production of these parts (abbreviated to the most relevant steps) is:
- developing 3D plies to form 2D blanks (this is carried out once per part type; the rest is carried out for each part)
- cutting plies from 2D textiles
- draping the plies over one half of the mold (or a special draping tool)
- closing the mold (including placing the cores, etc. and/or positioning the mold parts in the case of one-sided tools)
- infusing or injecting the dry textile
- curing cycle
- removing from the mold
- nondestructive testing (NDT)

The first work step—the cutting of plies from 2D textiles—is the target of the disclosure herein. If the shape into which the plies are to be molded is simple (such as e.g. developable surfaces), it is easy to define the contours for the 2D cutting.

If the surfaces are undevelopable, the definition of the contours requires a prediction of the draping process of the textile, which is necessary to mold the plies so as to form an undevelopable surface. This involves (local) shearing and/or elongation of the material, which often depends on the material properties and can be highly nonlinear.

Commercially available tools such as Catia or Hyperworks offer approaches for automating these processes and for predicting the correct shapes for the 2D cuts. For parts without internal ramps, this is largely unproblematic: The plies can be defined as larger than necessary and be corrected after they are laid along the part edges. However, if the part has internal ramps and/or ply overhangs, this becomes more complex.

According to the textile type and the surface complexity, the draping becomes nonlinear, depending on the material properties and the draping sequence. Additional complexity results from the desired fiber orientations, which have to be taken into account, and from effects such as the formation of folds after a certain shear extent. Taken together, these effects mean that it is actually not really possible to predict the flattened shape of the part without a certain degree of uncertainties/tolerances resulting from the complexity of the process.

If there is great complexity in the material characterization and the modeling of the draping process, it can be assumed that this error can become quite small—for off-the-rack tools, it was established that the error is in the region of a >10 mm deviation between the draped shape that was predicted and that was obtained for large (~2×1 m²) and highly curved parts.

This can be easily clarified by virtue of the geometries involved: an error of just 0.1° for predicted orientations over a 2 m long edge results in a deviation of approximately 3.5 mm at the end of such a geometry. Such a deviation would not be especially critical at the outer edge of the part. In the case of internal ramps etc., however, this becomes a greater issue.

In the case of internal ramps, even a small deviation can lead to a non-uniform fiber volume content (FVC) on account of the discrete nature of the plies. Ramps and tolerances should be selected such that they result in acceptable deviations. This is decisive if the ply positions do not correspond to the intended positions. For example, a ply at a certain cross section can be somewhat larger than intended, this causing a local increase in the FVC.

Although this is not to be criticized in and of itself, it can nevertheless easily become decisive. In the example case (2 plies over the entire length), if an individual ply is so much longer that it reaches the periphery of the intended ramp, the proportion by volume of fibers can locally increase by 50%.

At 60% nominal FVC, as can be found in many aeronautics and aerospace parts, this would lead to 90% local FVC. Such a high FVC can no longer be produced in a closed mold—since the tool would simply not close. If the skin is locally thicker, the effect can still result in a local FVC that is outside the tolerances and/or in an excessive influence on the local permeabilities, this influencing the filling of the structure and possibly leading to an unstable development of the flow front from one part to another.

As a countermeasure, up to now ramps have had a small angle (e.g. >>1:10) in order to reduce the effect of the variability of the ply edges. Furthermore, the FVC tolerances could be increased—however, both points are undesirable from the perspectives of cost and lightweight construction and can restrict the design freedom for such parts. It should be taken into account that measures of this type, such as small angles and the like, lose their effectiveness as the component size and component curvature increase, and when errors develop can still rise to unacceptable levels.

A solution is therefore proposed which allows the production of such parts, while the ply shapes involved (cut in 2D) can be corrected to a tolerance that is significantly narrower than that achievable using software of the prior art.

The idea described in the present document relates to parts with (relatively) steep inner ramps and/or ply overhangs, wherein the individual ply cuts can be corrected so that such a part can be produced in a tool that defines both sides of the ramp (e.g. closed mold for RTM manufacture or open mold with pressure pieces) for infusion processes.

The main process for the part production can fundamentally remain unchanged—before the first production of the parts, a correction loop is implemented that allows the 2D cutting and 3D draping of each individual ply within the required tolerances. This avoids quality problems that range from complete production stoppage (mold cannot close) to deviations in the local FVC and allows the use of steeper (internal) ramps and/or ply slopes in the case of production with closed "hard" molds or similar methods.

The outlined manufacturing approach for complex composite components with dry woven fabrics was:
- developing 3D plies to form 2D blanks (this is carried out once per part type; the rest is carried out for each part)
- cutting plies from 2D textiles
- draping the plies over one half of the mold (or a special draping tool)
- closing the mold (including placing the cores, etc. and/or positioning the mold parts in the case of one-sided tools)
- infusing or injecting the dry textile
- curing cycle
- removing from the mold
- nondestructive testing (NDT)

It is proposed to expand the first step as follows, in order to take into account uncertainties and deficiencies of existing development prediction tools:

Developed plies are cut; alternatively, the original aspect of the developed layers is replaced by simply draping a significantly overdimensioned woven fabric/material on the draping mold. It should be noted that the draping process selected follows the later production process as far as possible. Above all, in the case of double curvature, the precise operation in the case of draping can influence the final shape, for example as a result of changes to the draping sequence (that is to say, from which point on the textile draping is performed, in which directions shear is introduced into the material).

The deviation of the ply edges from the intended edges (e.g. ramps etc.) is measured.

The measurement can preferably take place against a laser projection of the intended ply edge and a measuring grid. The measurements can be carried out against another type of reference, e.g. markings on the tool, external tool edge, specific teaching etc. The measurements can also be carried out in an automated manner by image analysis, 3D scanning or similar approaches.

The 2D cut definition edges are then displaced by the measured deviations. The precise procedure depends on the measurement approach in the preceding step:

If, e.g., a measuring grid was used, corrections are made to the points on the measuring grid and correction values between them are estimated, e.g., by linear approximation or by definition of a spline on the basis of the measured points or by a method of taking the mean over multiple points etc.

If the entire edge was measured, e.g., by 3D scanning or image analysis, the correction can be used over the entire edge. This process is repeated until the acceptable tolerances between the intended and the obtained draped 3D ply shape are reached. The remaining tolerances (and the design of the ramps etc.) take into account that one hundred percent repeatability is not necessarily provided.

This process is repeated for all the plies of the part. It is possible to exclude simple layers in regions with low curvature from this process. Furthermore, plies having the same contour apart from a small offset (e.g., at a ramp) can be mapped from the same corrections.

The correction loops are particularly preferably carried out with consideration of the effect on the preceding plies. After this has all been carried out, the corrected 2D developments are cut and the "normal" manufacturing process for the component (and all subsequent parts with the same structure) can be started, the remaining minimum uncorrectable deviations remaining as a difference/effective scattering.

It should be noted that the process outlined facilitates the design rules (e.g., ramps with a higher angle can be manufactured) due to the remaining scattering, but care should nevertheless be taken in the design that minimum deviations of the ply edges do not have any unacceptable effects on the inner component quality (e.g., hard 90° ramps in complex doubly curved parts are still difficult if the part is thin).

BRIEF DESCRIPTION OF THE DRAWINGS

Example embodiments will be explained in more detail with reference to the appended schematic drawings, in which.

DETAILED DESCRIPTION

Figure 1:
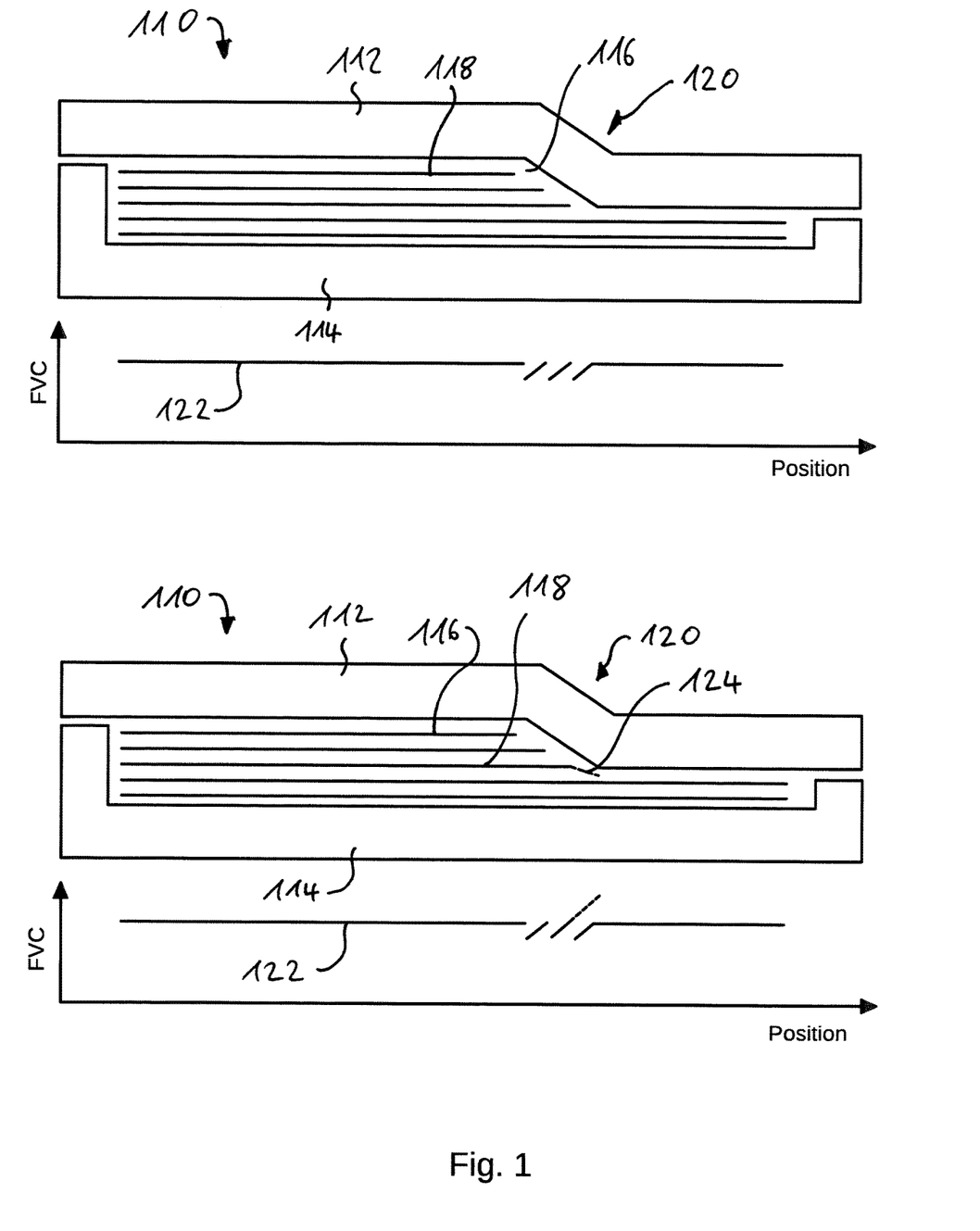
FIG. 1 shows an example of a ramp with different textile plies.

Reference is firstly made to FIG. 1, on the basis of which the problem addressed by the disclosure herein is to be explained in more detail. FIG. 1 shows a two-part molding tool 110. The tool halves 112, 114 enclose a mold cavity 116. A plurality of textile plies 118 of textile sheet material are arranged therein. The component to be formed therefrom is to have a ramp 120 in one region. The textile plies 118 adjoining the ramp 120 are ideally cut such that they follow the profile of the ramp 120 when placed one on top of another (at the top in FIG. 1). This results in a certain fiber volume content (FVC), illustrated in the diagrams, along the horizontal profile of the textile plies 118 (Position). The FVC corresponds to a nominal FVC 122 and is somewhat smaller in the region of the ramp 120. In this situation, the tool halves 112, 114 can be closed and the textile plies 118 can be provided with resin and cured in a manner known per se.

It is different, for example, if one of the textile plies 118 has an oversized region 124, as illustrated at the bottom in FIG. 1. In this case, in the region of the ramp 120 the FVC increases above the nominal FVC 122, this generally resulting in the molding tool 110 no longer being able to be closed.

It is also possible that one of the textile plies 118 has a shorter form, with the result that a certain overhang of the textile ply 118 lying above it forms. In this case, the FVC falls in turn below the nominal FVC 122 and can be compensated in another way.

The aim of the methods described below is in particular to avoid the aforementioned situations to the best possible extent.

Figure 2:
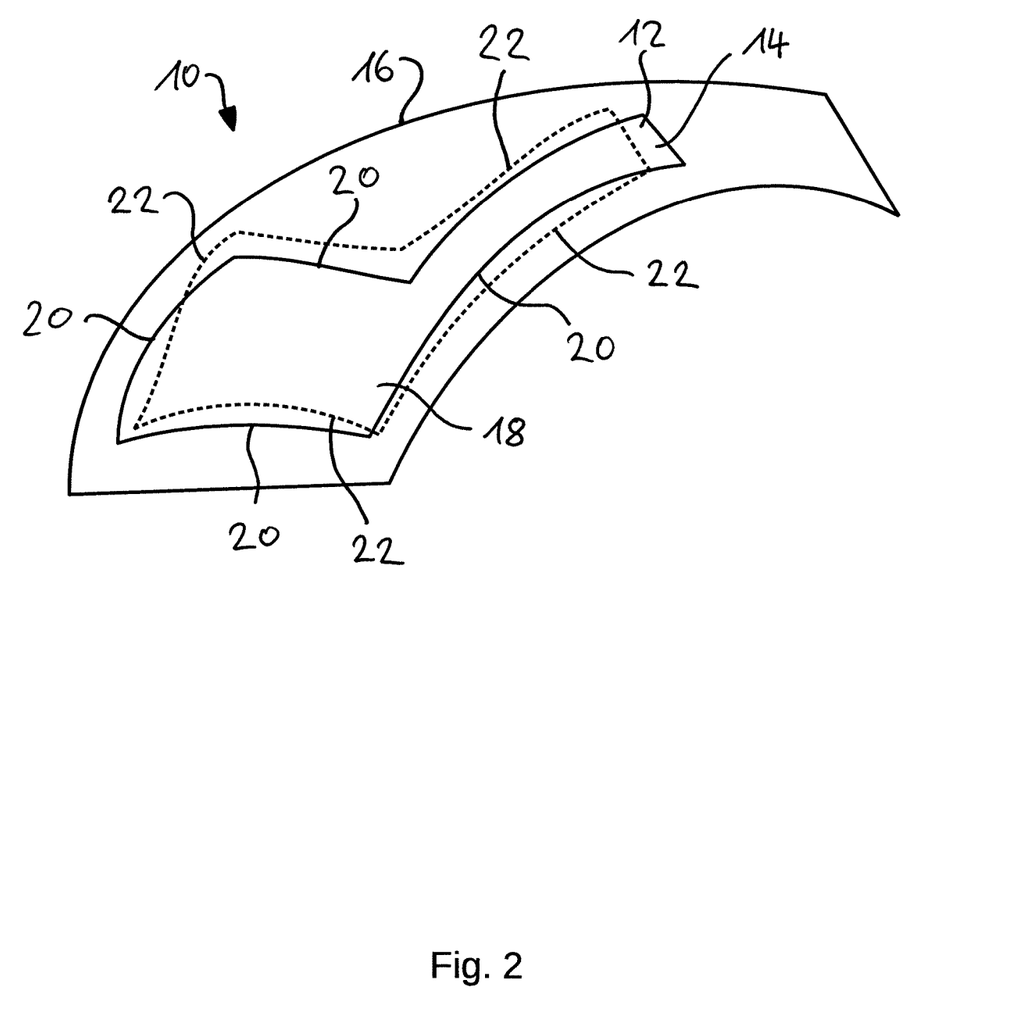
FIG. 2 shows a perspective view of a cut-to-size blank draped on a molding tool.
Figure 3:
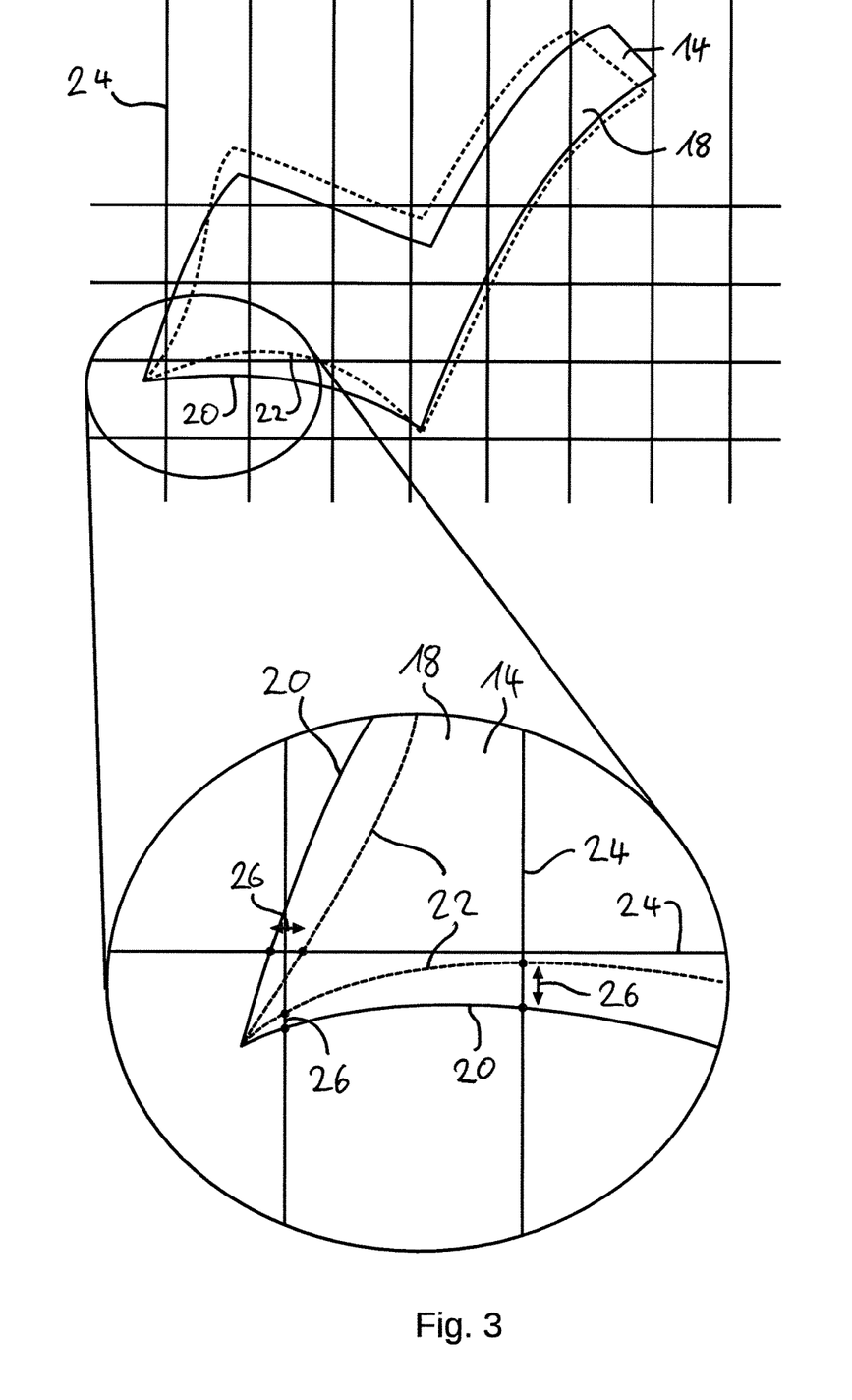
FIG. 3 shows an illustration of a measurement of the deviation of the cut-to-size blank edges from the setpoint cut-to-size edges.
Figure 4:
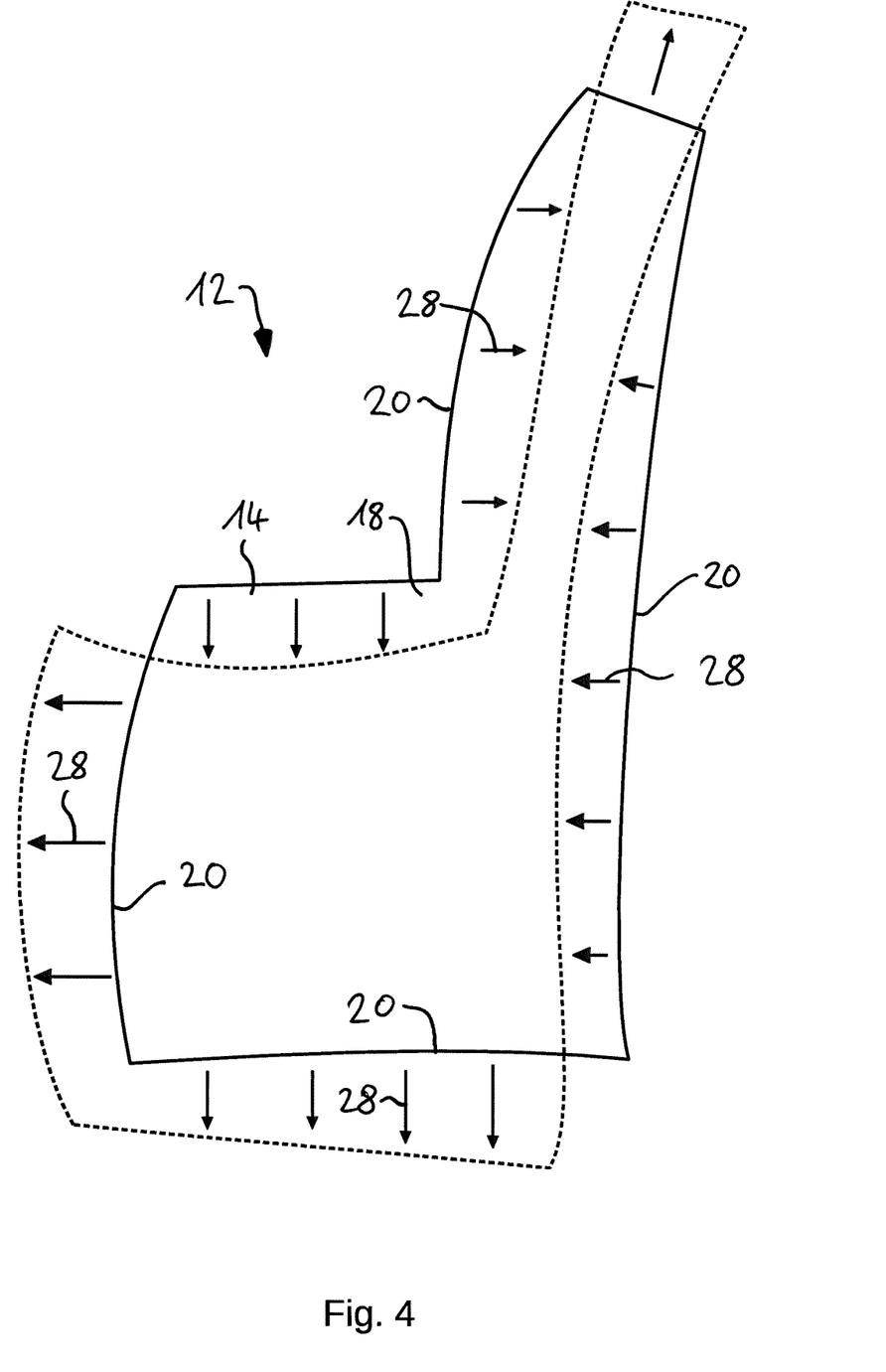
FIG. 4 shows an illustration of a change in the profile of the cut-to-size blank edge.

Reference is made below to FIGS. 2 to 4, which schematically show individual stations of a method for producing a composite component 10 with an undevelopable surface. Undevelopable surfaces have a double curvature to an extent that no longer permits conventional manufacture within predefined tolerances.

The composite component 10 is preferably an aircraft composite component suitable for an aircraft. Examples of such aircraft composite components are the rear pressure bulkhead and the wing tips, in particular with Sharklets. Wing tips are usually considered to be the last 4 to 5 meters of the wing in the outboard direction.

The composite component 10 is constructed from a plurality of textile plies 12. The textile plies 12 are textile sheet materials and may be prepregs, woven fabrics or laid fabrics, for example.

First of all, the textile sheet material 14 is cut to size by using a conventional method. In the process, the 2D cut grid for the sheet material 14 can be calculated by CAD software that is conventional in the art. However, in order to stay within predefined tolerances, the following refinement according to the disclosure herein is necessary.

The sheet material 14 is firstly draped on a molding tool 16 in the form of a cut-to-size blank 18. The cut-to-size blank 18 has at least one cut-to-size blank edge 20. On account of the properties of undevelopable surfaces, the profile of the cut-to-size blank edge 20 will not correspond to the profile of the setpoint cut-to-size edge 22. The setpoint cut-to-size edge 22 specifies where the cut-to-size blank edge 20 should run so that the desired geometry within the tolerance limits is brought about after the cut-to-size blank 18 has been draped.

Then, as is illustrated in more detail in FIG. 3, the deviation of the cut-to-size blank edge 20 from the setpoint cut-to-size edge 22 is measured. In one case, this can be done by a laser projection of the setpoint cut-to-size edge 22 and a measuring grid 24. The deviations 26 of the cut-to-size blank edge 20 and the setpoint cut-to-size edge 22 can be measured pointwise by hand, for example.

However, it is preferred that the cut-to-size blank edge 20 is measured automatically, for example using an image evaluation method or on the basis of a laser scan. The methods required for determining edges and distances are well known per se in other fields.

If the extent of the ascertained deviations 26 is above a predefined threshold value, the profile of the cut-to-size blank edge 20 is changed. The extent of the deviations 26 can be ascertained by gradient methods or similar methods, for example.

In this way, it is possible to ascertain a correction 28 for each measured point on the cut-to-size blank edge 20 from the deviations 26.

As is illustrated in more detail in FIG. 4, the cut-to-size blank edge 20 is changed on the basis of the deviations 26 or of the correction 28 calculated from them. The result is a new profile of the cut-to-size blank edge 20.

Then, a new cut-to-size blank 18 of the new cut-to-size blank edge 20 is created and in turn draped on the molding tool 16 or optionally on a preceding cut-to-size blank 18. Then, in turn, the deviation 26 of the profile of the cut-to-size blank edge 20 from the setpoint cut-to-size edge 22 is ascertained.

When the extent of the deviations 26 is below the predefined threshold value, the cut-to-size blank 18 remains on the molding tool 16 or a preceding cut-to-size blank 18. The cutting-to-size data, which specify the profile taken by the cut-to-size blank edge 20, are stored for this specific textile ply 12 and can then be used for the further production.

The method is carried out for each textile ply 12 incorporated in the composite component 10.

What is produced overall, iteratively and ply-by-ply, is therefore a 2D cut-to-size shape, which can create a composite component 10 within the predefined tolerances when draped on the molding tool 16.

In mass production, the textile sheet materials 14 are cut to size on the basis of the cutting-to-size data ascertained for each layer of the composite component 10 and then draped on the molding tool 16.

The molding tool 16 may be part of a closed molding process, such as for instance transfer molding (or resin transfer molding, RTM), but it can also be effected in combination with a vacuum bag method, optionally using pressure pieces.

In order to be able to maintain the tolerances when manufacturing especially large components in the case of composite components 10 with undevelopable surfaces, it is proposed according to the disclosure herein to drape a cut-to-size blank 18 on a molding tool 16 and to determine the deviation 26 of the cut-to-size blank edge 20 from the setpoint cut-to-size edge 22. Then, on the basis of the deviation 26, a new cut-to-size blank edge 22 is calculated and a new cut-to-size blank 18 is created and re-draped for examination purposes. The method is repeated until the deviations 26 are below a tolerable threshold value. The method is furthermore carried out for each textile ply 12 of the composite component 10.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Composite component
12 Textile ply
14 Sheet material
16 Molding tool
18 Cut-to-size blank
20 Cut-to-size blank edge
22 Setpoint cut-to-size edge
24 Measuring grid
26 Deviation
28 Correction
110 Molding tool
112 Tool half
114 Tool half
116 Mold cavity
118 Textile ply
120 Ramp
122 Nominal FVC
124 Oversized region

The invention claimed is:

1. A method for ascertaining cutting-to-size data, on a basis of which a textile sheet material can be cut to size to obtain a cut-to-size textile ply suitable for production of a three-dimensional composite component that is formed from textile plies and has an undevelopable surface, the method comprising:
   a) providing a substantially two-dimensional textile sheet material in a form of a cut-to-size blank, which has at least one cut-to-size blank edge;
   b) draping the cut-to-size blank on a molding tool or preceding cut-to-size blank suitable for the production of the three-dimensional composite component including the undevelopable surface;
   c) ascertaining a deviation of a profile, resulting from step b), of the cut-to-size blank edge and a reference profile, predefined by the undevelopable surface, from setpoint cut-to-size edges, wherein ascertaining the deviation of the profile comprises:
      providing a laser projection of the setpoint cut-to-size edges and a measuring grid over the cut-to-size blank; and
      applying an image evaluation method or laser scan to measure the deviation of the profile of the cut-to-size blank edge at each of a plurality of grid lines of the measuring grid from corresponding points on the reference profile of the setpoint cut-to-size edges;

d) when an extent of the deviation ascertained in step c) is above a predefined threshold value: removing the cut-to-size blank and changing the profile of the cut-to-size blank edge based on the deviation ascertained in step c) and repeating steps b) to d), otherwise storing the profile of the cut-to-size blank edge for this cut-to-size blank in a form of cutting-to-size data, and leaving the cut-to-size blank on the molding tool or the preceding cut-to-size blank.

2. The method of claim 1, wherein in step a) the cut-to-size blank is cut to size from the substantially two-dimensional textile sheet material as in a case of a developable surface.

3. The method of claim 1, wherein the substantially two-dimensional textile sheet material has an oversize in relation to the molding tool suitable for the production of the three-dimensional composite component.

4. The method of claim 1, wherein in step d) the profile of the cut-to-size blank edge is changed by cutting to size a further cut-to-size blank based on the changed profile of the cut-to-size blank edge.

5. The method of claim 1, wherein in step d) the profile of the cut-to-size blank edge is changed by continuing to cut the cut-to-size blank based on the changed profile of the cut-to-size blank edge.

6. The method of claim 1, wherein steps a) to d) are carried out for each textile ply of the composite component.

7. A method for cutting a substantially two-dimensional textile sheet material to size to obtain a cut-to-size textile ply suitable for production of a three-dimensional composite component that is formed from textile plies and has an undevelopable surface, the method comprising:
　a) carrying out the method of claim 1 to obtain cutting-to-size data; and
　b) cutting the substantially two-dimensional textile sheet material to size based on the cutting-to-size data to obtain the cut-to-size textile ply.

8. A method for producing a three-dimensional composite component that is formed from textile plies and has an undevelopable surface, the method comprising:
　a) carrying out the method of claim 7;
　b) draping cut-to-size textile plies on the molding tool to obtain a component precursor formed from textile plies; and
　c) carrying out a transfer molding method with a closed mold or a vacuum method with a vacuum bag to form the three-dimensional composite component from the component precursor.

9. The method of claim 1, wherein draping the cut-to-size blank on a molding tool or preceding cut-to-size blank comprises applying a draping sequence selected to regulate introduction of shear into the substantially two-dimensional textile sheet material to produce the profile of the cut-to-size blank edge.

\* \* \* \* \*